Oct. 26, 1965   E. J. CARON   3,214,656
TEMPERATURE COMPENSATING TRIMMER CAPACITOR
Filed July 3, 1961
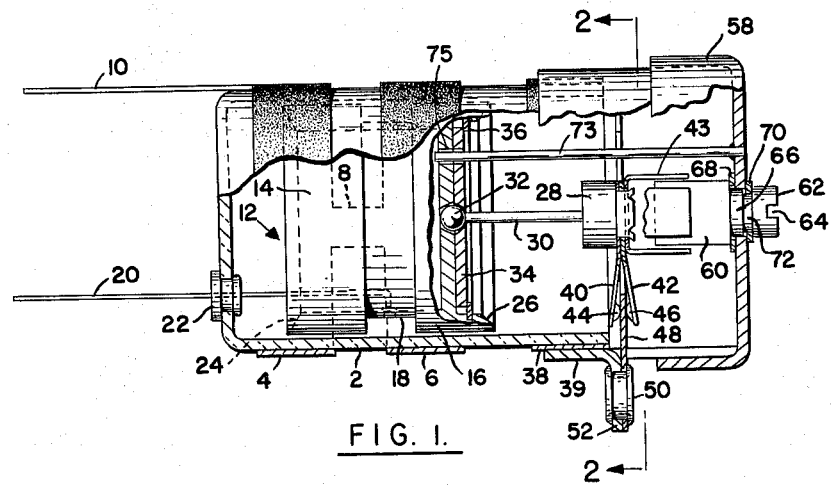
FIG. 1.
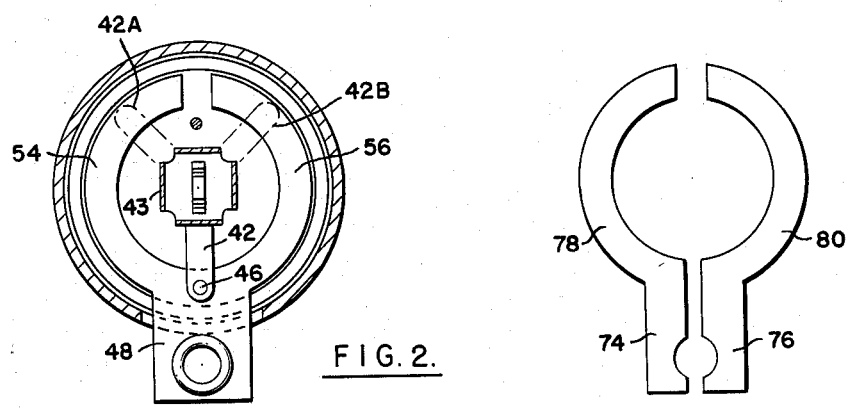
FIG. 2.
FIG. 5.
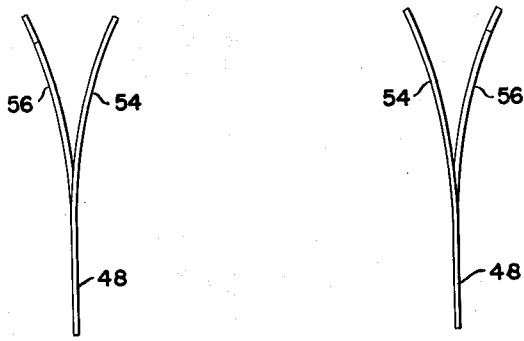
FIG. 3.   FIG. 4.
*INVENTOR.*
EUGENE J. CARON
BY
ATTORNEYS United States Patent Office 3,214,656
Patented Oct. 26, 1965

3,214,656
TEMPERATURE COMPENSATING TRIMMER
CAPACITOR
Eugene J. Caron, Collingswood, N.J., assignor, by mesne assignments, to TRW Inc., a corporation of Ohio
Filed July 3, 1961, Ser. No. 121,507
4 Claims. (Cl. 317—248)

This invention relates to a temperature compensating trimmer capacitor.

In many forms of tuned circuits, such as those for a radio frequency oscillator, drift with temperature will produce detuning to an unsatisfactory degree. This is particularly true in apparatus in which there may be a considerable temperature rise from its turned off condition to the condition attained in operation when the tubes and other elements have become fully heated. Ambient temperatures may also affect to a substantial degree the temperatures of the components during operation. It is usually difficult to determine, for a complex circuit, what the effect of temperature changes may be, and consequently a predetermined correcting element is not generally usable. It is a broad object of the present invention to provide a temperature compensating trimming capacitor which may be adjusted when the apparatus is first put into operation. Specifically, this may be accomplished by a series of steps such as the following:

With the trimming capacitor in a mid position of adjustment at which it would have no temperature compensating action, and with the apparatus first turned on so that its elements are at room temperature, tuning may be effected by adjustment of the main tuning elements of the circuit. The apparatus may then be continued in operation for such time as will insure that the various elements are at their normal operating temperatures. The trimming capacitor is then adjusted to retune the circuit under this heated operating condition. This adjustment may be for either positive or negative temperature compensation, in the sense that the capacity may be adjusted either to increase or decrease with increase of temperature. Following this last adjustment, subsequent changes of temperature will automatically be accompanied by proper compensation to maintain tuning to a substantial accuracy. The particular mode of operation achieving this compensation will be more apparent hereafter.

Further objects of the invention have to do with the provision of a trimming capacitor of this type which is mechanically stable and effective and which may be made in the small size generally required. These and further objects of the invention relating to details of construction wil become apparent from the following description read in conjunction with the accompanying drawings in which:

FIGURE 1 is an elevation, partially broken away, showing a preferred embodiment of the invention;

FIGURE 2 is a transverse section taken on the plane indicated at 2—2 in FIGURE 1;

FIGURES 3 and 4 are edge views of a bimetallic element which is used in the trimming capacitor showing the positions assumed by it for high and low temperatures with respect to normal; and FIGURE 5 is an elevation showing an alternative form for a two-part bimetallic element.

There is indicated at 2 a cup which may be formed of a dielectric such as glass, ceramic, quartz or a plastic material serving as a dielectric for the capacitor and also as a major portion of a housing. This is shown substantially enlarged, since usually the cup will be of small diameter for most uses, for example around ½ inch in diameter. Surrounding the exterior of the cup 2 are a pair of metallized rings 4 and 6 provided by any of the well-known metallizing processes to provide conductors. These may be joined by a metallized connector which is indicated at 8. A lead 10 is soldered or otherwise connected to one or both of the rings. The purpose of using a pair of rings is to secure a greater capacitance change for a given axial movement of an adjustable element which is generally designated as 12. (It will be understood that the metallized coatings are exaggerated in thickness for better showing thereof.)

The moving element 12 of the capacitor is in the form of a metallic spool-like member which has a pair of larger diameter portions 14 and 16 corresponding in axial length to the metallized rings 4 and 6, there being between these a portion 18 of less diameter. The element 12 is conductively joined to a lead 20 which is either guided (as shown) through a rubber or similar grommet 22, or is made flexible and looped to permit free movement of element 12. A sliding fit may be provided between the element 12 and the interior wall of the cup 2, the clearance being exaggerated in FIGURE 1. It may be noted that because of the concentric arrangement which is provided the capacitance will not change to any considerable extent due to slight radial movements of the element 12 or due to its rotation if that is permitted.

In another usage of the capacitor, no connection is made between the two bands. Each band is one plate of a capacitor and the axial movement of the core determines the capacitance between these two plates. In this version, no electrical connection is made to element 12.

Desirably, end capacitance effects are minimized by interiorly bevelling as at 24 and 26 the ends of the element 12.

A hub member 28 is connected through a stem 30 to a ball 32 which is received in a socket provided by a conical opening in the right hand portion of element 12 and a conical opening in a plate 34 which is secured to the element 12 by a snap ring 36. The arrangement just described provides flexibility to avoid binding during adjustments as will appear later. The cup 2 is provided with a further metallized ring 38 to which is soldered the metallic tube 39. To the hub member 28 there are secured, for example by staking, a pair of rings having radially extending arms 40 and 42, and a coupling socket 43 consisting of sheet metal having a central portion and axially extended flange portions to outline a square socket space as indicated in FIGURE 2. The arms 40 and 42 are provided with contact buttons or followers 44 and 46 and the arms act as springs to engage these buttons with an interposed temperature responsive element 48 which is secured to a tab 52 of the cap 39 by a rivet 50.

As will be most evident from FIGURE 2, the temperature responsive element 48 has a pair of arcuate extensions 54 and 56 which extend substantially concentrically with the axis of the assembly heretofore described with the free ends spaced. The two extensions 54 and 56 are of bimetallic type with the bimetallic laminations reversed so that upon change of temperature the deflections of the two extensions take place in opposite directions. This will be clear from FIGURES 3 and 4 where the extensions are shown, respectively, as they might appear, in one instance, when the temperature is above normal room temperature, and in the other instance when the temperature is below normal room temperature. At room temperature the two bimetallic extensions lie in the same transverse plane. It will be evident that, if the arms 40 and 42, which are directly opposite each other and pinch the element 48, rotate, the hub 28 will be displaced axially to displace correspondingly the element 12 if the free portions of the bimetallic arms are axially displaced by temperature changes.

While room temperature has been mentioned as that to which coplanar condition of extensions 54 and 56 exists, in outdoor operations under extreme climatic conditions the initial temperature condition might be otherwise. In such case, of course, the bimetallic extensions would be designed to be coplanar at the initial temperature conditions.

An end cap 58 which may be soldered to the tube 39 to form a part thereof is provided with a central opening through which there extends a cylindrical end formed on a square block 60 which is received in the coupling socket provided at 43. The head portion 62 of this extension is provided with a screw driver slot 64 for adjustment, and the element 60 is held in axial position by a washer 68 and a split ring 70 received in a groove 72. The arrangement illustrated provides for rotation of the hub 28 for the adjustable member 60 while relative axial movement is permitted by the clearances involved. A fixed pin 73 enters an opening 75 in the right hand end of the element 12 to prevent its rotation, while permitting free axial movement. This, of course, is unnecessary if a sufficiently flexible external lead is used or if a wiping connection is provided, or if no external electrical connection to element 12 is required; as in a split stator use. Rotation of element 12 does not affect the capacity.

The operation of what has been described will now be evident. With the trimmer capacitor in parallel with a main capacitor of a tuning circuit, which main capacitor may be adjustable for tuning, though tuning might be accomplished by other means such as variation of the position of a magnetic slug in a coil, it may be assumed that the arms 40 and 42 and their buttons or followers 44 and 46 are positioned as illustrated in full lines in FIGURE 2 at the neutral or fixed portion of the element 48. Assume also that the bimetallic extensions now lie in a common radial plane at the ambient temperature. Assuming the apparatus is now turned on, tuning may be effected through the main tuning elements before the parts of the apparatus have heated up to any substantial degree. Then, after operation for an extended period of time, the main tuning elements are untouched, but the member 60, and with it the hub member 28, is rotated until sharp tuning is reestablished. The rotation may be in one direction or the other, depending upon the direction of the compensation required, the retuning resulting from the fact that as the followers 44 and 46 follow the deflected extension 54 or 56 the element 12 will move axially to change the capacitance resulting from the axial relationship of the portions 14 and 16 of the element 12 to the metallized rings 4 and 6. The resulting adjustment should be sufficient if in the initial cold (room temperature) condition the elements 54 and 56 were substantially in the same plane. If room temperature was again resumed the element 12 would return to its initial position, irrespective of the angular position of arms 40 and 42. However, as will be obvious, the adjustments could well be made between two extreme temperatures through a trial and error procedure, especially if the apparatus was expected to operate through a wide range of temperatures. Extreme positions as might be assumed by the arms are indicated at 42A and 42B.

As will be evident from the foregoing, the circumferential departure of the arms 40 and 42 from their mid position will determine the effective rate coefficient of adjustment of the capacitance with temperature. If for a given temperature change the capacitance change is required to be large the displacement of the arms from central position will be considerable. On the other hand, if the compensation in capacity is relatively small for a given temperature range (due, for example, to a substantial mutual compensation of several circuit elements) the arms will be more nearly in their mid position. The trimmer, therefore, in a standard construction is adapted to a wide variety of different types of apparatus.

FIGURE 5 illustrates a simpler way of constructing the element corresponding to 48. As noted above, the two extensions 54 and 56 of the same element require opposite disposition of their laminations, and, therefore, the element must be stamped from a sheet of prelaminated bimetallic material, having the laminations reversed in two portions thereof symmetrically disposed with respect to the stampings. However, by separating the single element into two parts 74 and 76 and their respective extensions 78 and 80 they may be stamped from a single strip of uniform bimetallic material and then reversely associated, so that the extensions will deflect in opposite directions for a given temperature change.

If a damping dielectric, such as a silicone oil, is desired to be used within the cup 2, suitable sealing will be used in the form of a diaphragm to prevent leakage.

It will be evident that various changes may be made without departing from the invention as defined in the following claims.

What is claimed is:

1. A trimmer capacitor comprising substantially concentric cylindrical conductors constituting plate elements of the capacitor, means mounting said conductors for relative axial movements, and adjustable temperature-responsive means for effecting such relative axial movements to vary the capacitance between said conductors, the last mentioned means comprising an arcuate temperature-responsive bimetallic element having a fixed portion, a follower engaging said bimetallic element and connected to one of said conductors to produce said movements thereof, and means for adjusting said follower along said arcuate element relatively to the fixed portion thereof.

2. A trimming capacitor comprising conductors constituting plate elements of the capacitor, means mounting said conductors for relative movements, and adjustable temperature responsive means for effecting such relative movements to vary the capacitance between said conductors, the last mentioned means comprising an arcuate temperature-responsive bimetallic element having a fixed portion, a follower engaging said bimetallic element and connected to one of said conductors to produce said movements thereof, and means for adjusting said follower along said arcuate element relatively to the fixed portion thereof.

3. A trimming capacitor comprising conductors constituting plate elements of the capacitor, means mounting said conductors for relative movements, and adjustable temperature responsive means for effecting such relative movements to vary the capacitance between said conductors, the last mentioned means comprising a temperature responsive elongated bimetallic element having a fixed portion, a follower engaging said bimetallic element and connected to one of said conductors to produce said movements thereof, and means for adjusting said follower along said element relatively to the fixed portion thereof to adjust the extent of said relative movements per unit temperature change.

4. A trimmer capacitor comprising substantially concentric cylindrical conductors constituting plane elements of the capacitor, means mounting said conductors for relative axial movements, and adjustable temperature-responsive means for effecting such relative axial movements to vary the capacitance between said conductors, the last mentioned means comprising a temperature responsive bimetallic element having a fixed portion and an arcuate extension extending from said fixed portion generally transversely to said axis of relative movement of said conductors, said extension being responsive to temperature changes to deflect from said fixed portion in a direction along said axis of relative movement of said conductors, a follower engaging said bimetallic element and connected to one of said conductors to produce said movement thereof, and means for adjusting said follower along said arcuate element to vary the follower position relative to said fixed portion for adjusting the extent of such relative movement of said conductors per unit temperature change.

(References on following page)

References Cited by the Examiner

UNITED STATES PATENTS

| | | | |
|---|---|---|---|
| 2,591,644 | 4/52 | Wadsworth | 317—248 |
| 2,825,785 | 3/58 | Taylor | 200—113 |
| 2,830,155 | 4/58 | Smilo | 200—112 |

FOREIGN PATENTS

| | | |
|---|---|---|
| 108,680 | 10/39 | Australia. |
| 458,691 | 12/36 | Great Britain. |

LARAMIE E. ASKIN, *Primary Examiner.*

JOHN F. BURNS, E. JAMES SAX, *Examiners.*